April 3, 1973 H. K. HOFER ET AL Re. 27,607

DEVICE FOR STROKE LIMITATION HYDRAULICALLY DISPLACED MOLD CARRIER UNITS INJECTION MOLDS

Original Filed July 3, 1968

INVENTORS

HEINZ HOFER &

FRIEDRICH REHMSMEIER

BY Bair, Freeman & Molinare Attys.

United States Patent Office

Re. 27,607
Reissued Apr. 3, 1973

27,607

DEVICE FOR STROKE LIMITATION OF HYDRAULICALLY DISPLACED MOLD CARRIER UNITS ON INJECTION MOLDS

Heinz Karl Hofer, Langenholzhausen, and Friedrich Rehmsmeier, Vlotho, Germany, assignors to Stubbe Maschinenfabrik G.m.b.H., Kalletal-Kalldorf, near Vlotho, Germany Original No. 3,571,855, dated Mar. 23, 1971, Ser. No. 742,384, July 3, 1968. Application for reissue July 27, 1971, Ser. No. 166,369
Claims priority, application Germany, July 5, 1967, P 15 83 703.3
Int. Cl. B29f *1/00*
U.S. Cl. 425—450 8 Claims

Matter enclosed in heavy brackets [ ] appears in the original patent but forms no part of this reissue specification; matter printed in italics indicates the additions made by reissue.

ABSTRACT OF THE DISCLOSURE

A device for limiting the stroke on hydraulically displaced mold-carrier units of injection molding machines, by means of an abutment element which is infinitely variably adjustable relative to a setting or adjusting device arranged in the axial direction of the actuating piston of the mold-carrying unit, and which by cooperation with the actuating piston, limits the stroke end position thereof.

BACKGROUND OF THE INVENTION

The mold-carrying unit of injection molding machines generally contains a movable mold-clamping plate and a counterplate (which may be considered to be stationary relative thereto), both plates carrying half of the injection mold. If larger molds are used, in particular such as are used for the manufacture of relatively long articles, then normally the full opening stroke of the movable plate is necessary in order to be able to properly remove the article from the mold. For smaller molds on the other hand a correspondingly shorter opening stroke is adequate. Thus, employing an adjustable stroke-limiting means, it becomes possible to vary the mold-opening stroke and to adapt it to the mold heights obtaining in each specific case. In this way, for each mold size, opening times of optimum low value are achieved and thereby maximum injection rates are obtained. Furthermore, there is a saving of energy for the pressure medium.

In addition to a series of adjustable stroke-limiting arrangements which are useless for hydraulically actuated mold-carrier units of injection molding machines, a device is already known wherein there is arranged in the piston chamber of the closure cylinder, in axial prolongation of the actuating piston connected with the movable tool-clamping plate, an abutment element for the piston head which engages with a spindle and is adapted to be displaced forwardly or rearwardly, in infinitely variable manner, by rotating the spindle. With this arrangement, the abutment element may be designed as a screw-threaded sleeve screwed on the spindle and the end of the actauting piston facing the sleeve may be provided with a short prolonging portion sliding, with relatively slight play, into the sleeve.

This known device is, per se, extremely suitable for the mold-carrying units of injection-molding machines, since it acts centrally on the moving parts of the mold-carrying units and in this way avoids tilting movements and unnecessary wear within the guide bushings. Additionally, however, when the piston travels against the sleeve, there are no hard impacts since the pressure medium contained within the sleeve is displaced through the prolonging portion at the end of the opening stroke and is able to escape only via the narrow annular gap between the prolonging portion and the sleeve. This damps the abutment movement, the damping effect being extremely useful for the entire device. At the same time, for example in contradistinction to what obtains with rubber cushioning means, extremely accurate limitation of the opening stroke is achieved, this being something which is necessary for exact operation in particular when using ejectors.

Despite the advantages of the known device, its use involves the disadvantage that it requires a considerable amount of space. The stroke limitation must be at least as long as the adjustment zone of the stroke and furthermore it must be located behind the piston head. Consequently, the structural length of the mold-carrying unit is increased to an extremely disadvantageous extent and in some cases, for example if a multiplicity of mold-carrying units is arranged on a round table or the like, the use of the known device is possible only with very great difficulty or it may even be impossible.

BRIEF SUMMARY OF THE INVENTION

In contradistinction thereto, it is intended to provide with our invention a form of infinitely variable stroke limitation which has all the advantages of the known device without having the disadvantages thereof in respect of space requirement. This object is achieved by an arrangement whereby the abutment element is designed to be displaceable, together with its adjusting device, into an axial blind aperture in the actuating piston.

In this way, the invention carries into effect the idea whereby the stroke limitation is shifted, practically completely, into the actuating piston of the hydraulic unit, in such manner decisively diminishing the structural length of the machine as a whole.

In a preferred embodiment of the invention, the abutment element is a screw-threaded sleeve which is adjustable along an adjusting thread and which carries at its end remote from the actuating piston an abutment flange cooperating with a terminal annular face on the piston. Due to this arrangement, the abutment zone proper remains within the zone of the outer piston end, this being extremely advantageous from the double viewpoints of manufacture and maintenance. At the same time, this arrangement also permits the functional achievement of further, especially advantageous developments.

Expediently, the adjusting screw thread contains a screw-threaded tube which is open at its end face in the direction towards the piston and on which the internal screw thread of the threaded sleeve is screwed, the inner space of the threaded tube being connected, via conduit, with the pressure chamber before the piston ring face. In this way, independently of the shape of the sleeve and of the blind aperture surrounding it, when the piston bears against the flange (i.e. at the commencement of a closure stroke) when the pressure medium acts on the piston, not only the terminal annular face thereof but the entire piston face is acted upon.

Also damping of the abutment movement is possible in a simple manner, with out invention. For this purpose, it suffices to arrange in the conduit a nonreturn valve which blocks the throughflow from the internal chamber of the threaded tube into the pressure chamber before the piston ring face, and to adapt the diameter of the screw-threaded sleeve, at least over a portion of its length, in such manner to the zone of the blind aperture adjacent the annular face that a narrow annular gap forms, in the open position of the piston, between the screw-threaded sleeve and the blind aperture. If the piston is displaced in the direction towards the flange, the annular gap between the outer wall, the threaded sleeve and the blind aperture thus behaves in a manner similar to the annular chamber provided in the known device, between the sleeve inner wall and the piston projection or attachment.

For the adjustment of the position of the sleeve along the screw-threaded tube, various means may be used. It has been found to be especially simple and functionally reliable to attach to the screw-threaded sleeve a threadless prolongation engaging in spaced relationship and in sleeve-like manner about the stationary screw-threaded tube, and the end of which projects beyond the end of the screw-threaded tube; such prolongation being formed with at least one longitudinal groove in which a driving dog attached to a spindle engaging through the screw-threaded tube engages in such manner as to be longitudinally displaceable.

In order to achieve an adequately variable stroke zone without enlarging the structural length of the machine by means of an externally projecting stroke-limiting device according to the invention, the blind aperture may, in particular if short pistons are used, also extend into the correspondingly large-dimension piston rod. The expression "piston" is therefore to be understood to be of quite general significance and it may, if appropriate, also include the zone of the piston rod adjacent the piston proper.

Further details of the invention will be discussed in greater detail hereinbelow, with reference to an illustrated embodiment and with reference to the drawings, wherein:

DESCRIPTION OF THE PREFERRED EMBODIMENT

Figure 2:
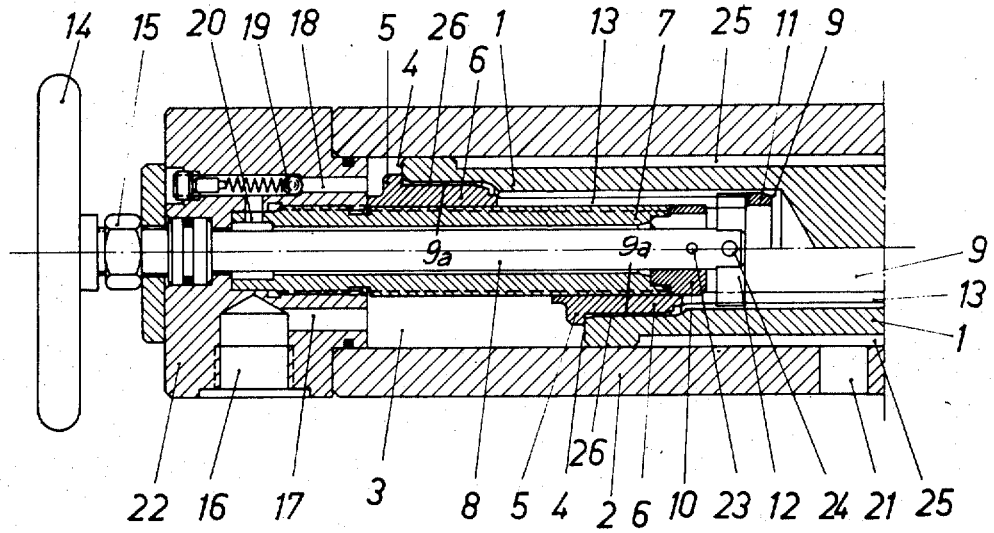
FIG. 2 shows a cross section through the same device according to our invention, wherein the upper half of the figure shows the actuating piston in its maximum opening stroke position limited by the abutment and the lower half thereof shows it in its minimum opening stroke position limited by the abutment in another adjusted position.
Figure 1:
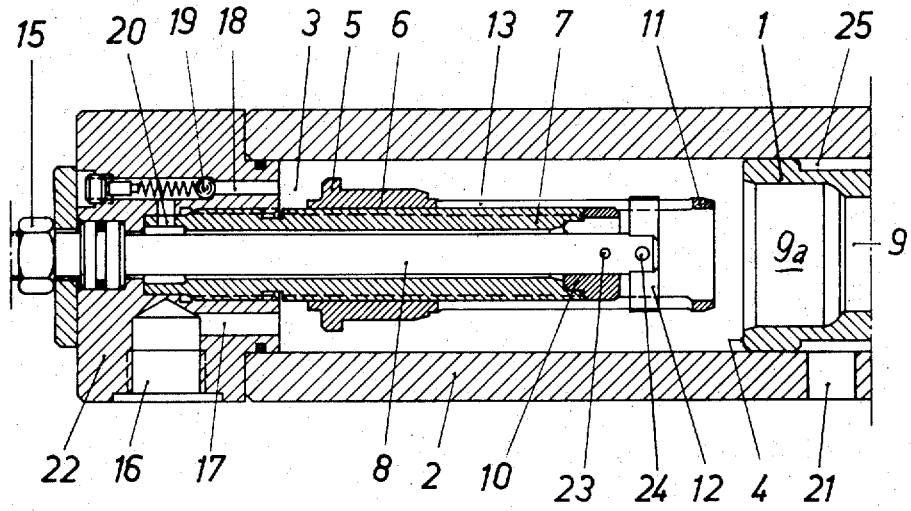
FIG. 1 shows a cross section through a stroke-limiting device according to our invention, wherein the actuating piston is disposed in the closure position.

In the case of the embodiment illustrated, what is concerned is a hydraulic closure unit for a mold-carrying unit (not shown) of an injection molding machine. The piston 1 of the closure unit serves for the actuation of the displaceable mold-clamping plate of the mold-carrying unit and slides in a piston chamber 3 formed in a cylinder 2 and provided with pressure oil connections 16 or 21. In one of its end positions (closure position) the piston 1 presses the movable mold-clamping plate in the direction towards the counterplate (which is to be considered as being stationary), so that the halves, secured to the two plates, of an injection mold are closed. In its further end position (open position) the piston 1 draws the movable mold clamping plate sufficiently far from the counterplate to open the mold for the purpose of removing the molded article.

For determining the open position of the piston 1 and therewith for limiting the piston stroke, there is provided a stop or abutment designed as an annular flange 5 on a screw-threaded sleeve 6 adjustable in infinitely variable manner along an adjusting thread. The adjusting thread extends coaxially with the piston 1 and extends, with clearance, in such manner into an axial blind aperture 9 (for example a blind bore) and a counterbore 9a formed in the piston (or in the piston rod attached thereto) that the stop flange 5 of the screw-threaded sleeve 6 is able to cooperate with the left-hand end face 4 of piston 1.

In detail, it may be said that the adjusting thread for the threaded sleeve 6 contains a screw-threaded tube 7 which is open at its right-hand end face, is secured in a rear cylinder head 22 of the closure unit (being for example screwed therein and secured against rotation) and on which the screw-threaded sleeve 6 is guided through the agency of its internal thread. Through the screw-threaded tube 7 extends, in the axial direction, spindle 8 which, near its end facing the piston 1, is retained (for example by means of a pin 23 secured to it) by a guide ring 10 supported for rotation in a counterbore of the screw-threaded tube 7. The guide ring 10 simultaneously prevents the screw-threaded sleeve 6 from moving axially beyond the end of the screw-threaded tube 7. Secured transversely of the axis of the spindle 8, at the piston end thereof (for example by means of a further pine 24) is a drive dog 12, the opposite ends of which engage in two longitudinal grooves 13 machined into a sleevelike but unthreaded prolongation 11 of the threaded sleeve 6. The spindle 8 is mounted, in the zone of its outer end remote from the piston 1, for rotation in the cylinder head 22 and is there sealed off in conventional manner relative to the piston chamber 3. Externally of the cylinder head, it carries for actuating purposes, a hand wheel 14 and also (in order to prevent unintentional rotation) a lock nut 15 adapted to be tightened against the cylinder head, in this way retaining the spindle in a position thereof adjusted by means of the hand wheel.

On rotation of the hand wheel 14 via the spindle 8 and the drive dog 12, the screw-threaded sleeve 6 is rotated on the screw-threaded tube 7, the sleeve 6 in this way being moved forwardly or rearwardly, depending on the direction of rotation of the hand wheel. In this manner, the position of the flange 5 may be so adjusted (in infinitely variable manner) that a predetermined open position of the piston 1 results. The open position of the piston 1 is so selected as to correspond to the size of the mold which has been clamped in position, whereby upon the opening stroke thereof, only that piston travel which happens to be necessary at that instant will be effected. In this way, also the time required for the opening stroke is shortened, so that the timing velocity of the machine and the output thereof may be substantially increased.

When the piston 1 is in the open position (FIG. 2), the pressure medium flows for piston actuation through the pressure oil connection 16 and a conduit 17 into the piston chamber 3 and first of all acts directly on the annular flange 4 of the piston 1 in the closure direction. Simultaneously, however, the pressure medium also flows in, via a duct 18 provided in the cylinder head 22 and opens a nonreturn valve 19, via a duct 20 releases the pressure medium in the intermediate space between the spindle 8 and the inner bore of the screw-threaded tube 7. From there the pressure medium flows into the counterbore 9a and the blind bore 9 in the piston 1, so that the immediate result is that the entire cross section of the piston is acted upon by pressure medium, i.e. the closure stroke is initiated rapidly and with full force. As soon as the rear piston end has moved forwardly beyond the screw-threaded sleeve 6, the pressure medium no longer follows the path via the nonreturn valve 19 but is then able to act directly on the entire piston face.

On the opening stroke of the piston 1, the pressure medium is conveyed through the connection 21 into a piston-rod-side pressure chamber 25, so that the piston is pushed back into the open position. As soon as the annular face 4 comes within range of the screw-threaded sleeve 6, a narrow annular gap 26 forms between the surface of the screw-threaded sleeve 6 and the walls of the counterbore 9a. The pressure medium contained in the blind bore 9 is then able to escape only through this annular gap, since the nonreturn valve 19 blocks any return flow of the pressure medium through the space between the spindle 8 and the screw-threaded tube 7, and the ducts 20 and 18. Due to the narrow cross section of the annular gap, this flow-away of the pressure medium is so hindered that there is built up a counterpressure which, towards the end of the opening stroke, delays the piston movement. Thus, as the final result, the annular face 4 impinges relatively gently against the flange ring 5, the piston movement being thereby braked in cushioned manner and, when the piston impinges against the limiting stop, hard impacts which would be detrimental to the machine and which might result in premature rupture of the stroke-limiting means, are avoided.

We claim:

1. A stroke-limiting device for a hydraulically displaced actuating piston in a mold-carrying unit of an injection-molding machine, comprising: an abutment element which is adjustable in an infinitely variable manner on an adjusting device arranged in the axial direction of the actuating piston of the mold-carrying unit and which, by cooperating with the actuation piston, limits the stroke end position thereof; characterized in that the abutment element is designed to be displaceable, together with its adjusting device into an axial blind aperture in the actuating piston; further characterized in that the abutment element is a screw-threaded sleeve which is adjustable along an adjusting thread and which carries at its end remote from the actuating piston an abutment flange cooperating with the annular face of the inner end of the actuating piston; still further characterized in that said adjusting thread contains a stationary screw-threaded tube which is open at its end face in the direction towards the actuating piston and on which said screw-threaded sleeve is screwed by means of an internal screw thread, the inner space of said screw-threaded tube being hydraulically connected with a pressure chamber beyond said annular face.

2. A device according to claim 1, characterized in that a nonreturn valve is provided which blocks the throughflow of fluid from said inner space of said screw-threaded tube into said pressure chamber beyond said annular face.

3. A device according to claim 2, characterized in that the diameter of said screw-threaded sleeve, at least over a portion of its length, is so adapted to the zone of said blind aperture adjacent said annular face that, in the mold-open position of the piston, a narrow annular gap is formed between said screw-threaded sleeve and said blind aperture.

4. A device according to claim 3, characterized in that said screw-threaded sleeve has a threadless prolongation which engages said stationary screw-threaded tube in spaced relationship and in sleevelike manner, and which projects at its end beyond the end of said screw-threaded tube and is formed with a longitudinal groove in which a drive dog is slidably disposed, a spindle being provided on which said drive dog is mounted and which, upon rotation, rotates said abutment element for varying its position along said screw-threaded sleeve.

5. A device according to claim 3, characterized in that a spindle is provided extending from the exterior of said mold-carrying unit through said stationary screw-threaded element and beyond the inner end thereof, and a slidable and nonrotatable connection is provided between said spindle and said abutment element whereby rotation imparted to said spindle, exterior of said mold-carrying unit, effects rotation of said abutment element for varying its position along said screw-threaded sleeve.

6. A stroke-limiting device for a hydraulically displaced actuating piston that has a first face and a second face to which an axial, piston rod is secured and that is a part of a mold-carrying unit of an injection molding machine comprising: a cylinder including an axial bore in which the actuating piston is adapted to reciprocally move during operation of the mold-carrying unit; wall means positioned across the end of the cylinder adjacent to the first face of the actuating piston; an adjusting device disposed at least in part within said axial bore; an axial, blind aperture in the first face of the actuating piston, said blind aperture being of sufficient size to receive therein at least a portion of the part of the adjusting device disposed within the axial bore; and an abutment element which is adjustable in an infinitely variable manner on the adjusting device in a direction substantially parallel with the longitudinal central axis of the cylinder and which has a dimension, in a plane substantially parallel to the plane of the first face of the actuating piston, greater than the transverse dimension of said blind aperture, the abutment element, the adjusting device and said blind aperture being arranged so that the abutment element cooperates with the actuating piston to limit the stroke end position thereof when the actuating piston is moving forward the wall means.

7. A device according to claim 6, wherein the adjusting device is supported by the wall means; and wherein at least the portion of the adjusting device is disposed in a direction parallel with the longitudinal central axis of the cylinder.

8. A device according to claim 7, wherein the abutment element includes a continuous annular surface which faces the first face of the actuating piston, which is disposed in a plane parallel to the plane of the first face of the actuating piston and which is adapted to come into contact with the first face of the actuating piston; and wherein the transverse dimension of the portion of the adjusting device is selected, with respect to outer dimension of said blind aperture, so that in the mold open position of the actuating piston, a narrow annular gap is formed between the portion of the adjusting device and said blind aperture.

References Cited

The following references, cited by the Examiner, are of record in the patented file of this patent or the original patent.

UNITED STATES PATENTS

| | | | |
|---|---|---|---|
| 2,501,329 | 3/1950 | Hall | 425—251 |
| 2,911,952 | 11/1959 | Paras | 91—405 X |
| 3,407,710 | 10/1968 | Weiss | 92—13 |
| 3,568,571 | 3/1971 | Hoen | 91—405 X |

H. A. KILBY, Jr., Primary Examiner

U.S. Cl. X.R.

425—151, 214; 91—5; 92—13